US008675352B2

(12) United States Patent
Wessells et al.

(10) Patent No.: US 8,675,352 B2
(45) Date of Patent: Mar. 18, 2014

(54) FLEXIBLE MOUNTING SYSTEM STORAGE MODALITY

(75) Inventors: Philip G. Wessells, Mill Valley, CA (US); Michael E. Woods, San Rafael, CA (US)

(73) Assignee: Grifiti LLC, Jackson, WY (US)

( * ) Notice: Subject to any disclaimer, the term of this patent is extended or adjusted under 35 U.S.C. 154(b) by 101 days.

(21) Appl. No.: 12/970,941

(22) Filed: Dec. 17, 2010

(65) Prior Publication Data

US 2012/0154988 A1 Jun. 21, 2012

(51) Int. Cl.
*H05K 7/00* (2006.01)
*B23P 11/00* (2006.01)

(52) U.S. Cl.
USPC ............ 361/679.01; 361/679.02; 361/679.03; 361/679.04; 361/679.05; 361/679.06

(58) Field of Classification Search
USPC .................................................... 361/679.01
See application file for complete search history.

(56) References Cited

U.S. PATENT DOCUMENTS

| 4,091,974 A * | 5/1978 | McClintock ................... 224/257 |
| 6,540,184 B2 * | 4/2003 | Thaxton ....................... 248/160 |
| 7,798,452 B1 * | 9/2010 | Wessells et al. ........... 248/163.1 |

* cited by examiner

*Primary Examiner* — Tuan T Dinh
*Assistant Examiner* — Mukund G Patel
(74) *Attorney, Agent, or Firm* — Patent Law Offices of Michael E. Woods; Michael E. Woods

(57) ABSTRACT

A method for a portable device, the method including a) decoupling a first flexible element from a support body coupled to the portable device, the first flexible element and one or more additional flexible elements, when coupled to the support body, cooperatively supporting the support body and the portable device above a work surface; b) coupling the first flexible element to one additional flexible element of the one or more additional flexible elements; c) flexing the first flexible element and at least one of the one or more additional flexible elements into a carrying component, the carrying component including a generally arcuate path, the arcuate path including a deflection of the elements of at least about 90 degrees; d) coupling the carrying component to the portable device.

7 Claims, 13 Drawing Sheets

FLEXIBLE MOUNTING SYSTEM STORAGE MODALITY

CROSS REFERENCE TO RELATED APPLICATIONS

This application is related to U.S. patent application Ser. No. 10/618,847 filed 14 Jul. 2003 (U.S. Pat. No. 7,798,452 entitled MULTIUSE DEVICE MOUNTING SYSTEM AND METHOD issued 21 Sep. 2010), the contents of which are hereby expressly incorporated by reference in their entirety for all purposes.

BACKGROUND OF THE INVENTION

The present invention relates generally to a device mounting system and more specifically to an apparatus and method including one or more flexible shape-retaining shafts for engaging, holding and pointing "things" (e.g., imaging devices like cameras, DVR, microphones, and audio or video recorders and the like) and for transitioning into a porting mode to enhance portability of both the "thing" and of the mounting system, the porting mode most preferably including neck/shoulder straps made from elements of the mounting system.

Portability is an important characteristic of many devices in use today, and in many cases the usefulness of the device is directly related to its efficiency in a portable mode. One particular class of device for which this is true is the class of imaging devices. This class includes portable cameras of all sorts including digital cameras and video cameras. These portable cameras range widely in size from the very small to the barely portable. Common uses of the portable camera include applications requiring particularly steady positioning and operation as well as remote operation.

The camera art has developed the tripod as a relatively stable mounting system for engaging and holding the portable camera. It satisfies the requirements of providing a platform for steady positioning and operation, and permits easy remote operation. Many different tripods have been developed to address concerns with size and weight, as well as to adapting a camera to an imaging environment.

Tripods have an inherent disadvantage in that they require a stable, nearly planar surface upon which to be set up. Telescoping legs make the tripod somewhat adaptable to uneven surfaces. It is often the case that the more complex and adaptable the tripod, the more inconvenient and difficult it is to setup. The more inconvenient and difficult it is to setup a tripod directly inhibits its use notwithstanding its usefulness.

The art has seen solutions to some of the drawbacks of the tripod, such as the requirement for a suitable, nearly flat, stable surface upon which to setup. One solution has been to mount a camera to the tripod, then lash the tripod to another nearby object using separate cords such as one or more bungee cords.

The present invention makes use of flexible shape-retaining shafts. It is known to provide flexible shape-retaining shafts in other contexts, such as for illumination systems or other lightweight device to be powered from an attendant portable electronic device. For example, the Snakelight Flexible Flashlight available from Black and Decker, 626 Hanover Pike, Hampstead, Md. 21074 as well as the Flylight™ and the FlyFan™ available from Kensington Technology Group, 2000 Alameda de las Pulgas, Second Floor, San Mateo, Calif. 94403-1289 are examples of prior art devices that have flexible shape-retaining shafts for positioning a device in a desired location.

The Snakelight provides a self-powered flashlight unit for hands-free lighting by bending, coiling draping or wrapping the flexible core in virtually any way to direct a light at one end as desired. The Flylight™ and the Flyfan™ provide for devices powered from the batteries of a portable electronic device (e.g., a laptop computer) through a port (e.g., a USB port of the laptop). Each device has a specialized function and includes a powered option for an active component integrated into a head of the device.

The referenced patent application provided an apparatus and solution that increased usefulness and decreased some challenges associated with using a mounting system (e.g., a tripod) with a portable electronic device (e.g., an imaging device).

However useful during use, one of the challenges remaining with mounting systems, including flexible mounting systems, is how to carry and arrange your mounting system as you move from location to location. The flexible mounting system of the incorporated patent application eases some of the difficulties of moving the mounting system but further improvement in this regard would be more convenient for users. What is needed is a flexible mounting system and method that eases challenges associated with relocating a stationary mounting system used with portable devices, typically portable electronic pointing devices.

BRIEF SUMMARY OF THE INVENTION

Disclosed is a flexible mounting system and method that eases challenges associated with relocating a stationary mounting system used with portable devices. A method for a portable device, the method including a) decoupling a first flexible element from a support body coupled to the portable device, the first flexible element and one or more additional flexible elements, when coupled to the support body, cooperatively supporting the support body and the portable device above a work surface; b) coupling the first flexible element to one additional flexible element of the one or more additional flexible elements; c) flexing the first flexible element and at least one of the one or more additional flexible elements into a carrying component, the carrying component including a generally arcuate path, the arcuate path including a deflection of the elements of at least about 90 degrees; d) coupling the carrying component to the portable device.

A carrying system for a portable device, including a flexible assembly having a first flexible assembly element, a second flexible assembly element, and a third flexible assembly element, each element including a first end and a second end with the assembly including both a unitary mode with a first end of the first element coupled to a second end of the second element and a first end of the second element coupled to a second end of the third element to produce a single integrated flexible support structure and a multipart mode wherein the elements are separated to produce a multilegged support, the flexible assembly and each the flexible assembly element adapted to be repetitively positioned into a plurality of orientations by movement into a first particular orientation wherein the first particular orientation is retained until movement into a second particular orientation; and a mounting head, coupled to the first end of the third element in the unitary mode and coupled to the first ends of the elements in the multipart mode, for coupling to the portable device; wherein the flexible elements and the mounting head are coupled together in series and form a carrying component couplable to the portable device wherein the carrying component includes a generally arcuate path, the arcuate path including a deflection of the carrying component of at least about 135 degrees.

The preferred embodiment permits simple efficient setup, use and storage of a device mounting system. When used in conjunction with an imaging device, the preferred embodiment allows the imaging device to be quickly positioned into a desired orientation that is steady in many different environments.

These and other novel aspects, features, benefits, and advantages of the present invention will be apparent to those of ordinary skill in the art upon review of the present disclosure, including the specification, drawings, and claims.

DETAILED DESCRIPTION OF THE INVENTION

Embodiments of the present invention include a flexible mounting system and method that eases challenges associated with relocating a stationary mounting system used with portable electronic devices. The following description is presented to enable one of ordinary skill in the art to make and use the invention and is provided in the context of a patent application and its requirements.

Figure 1:
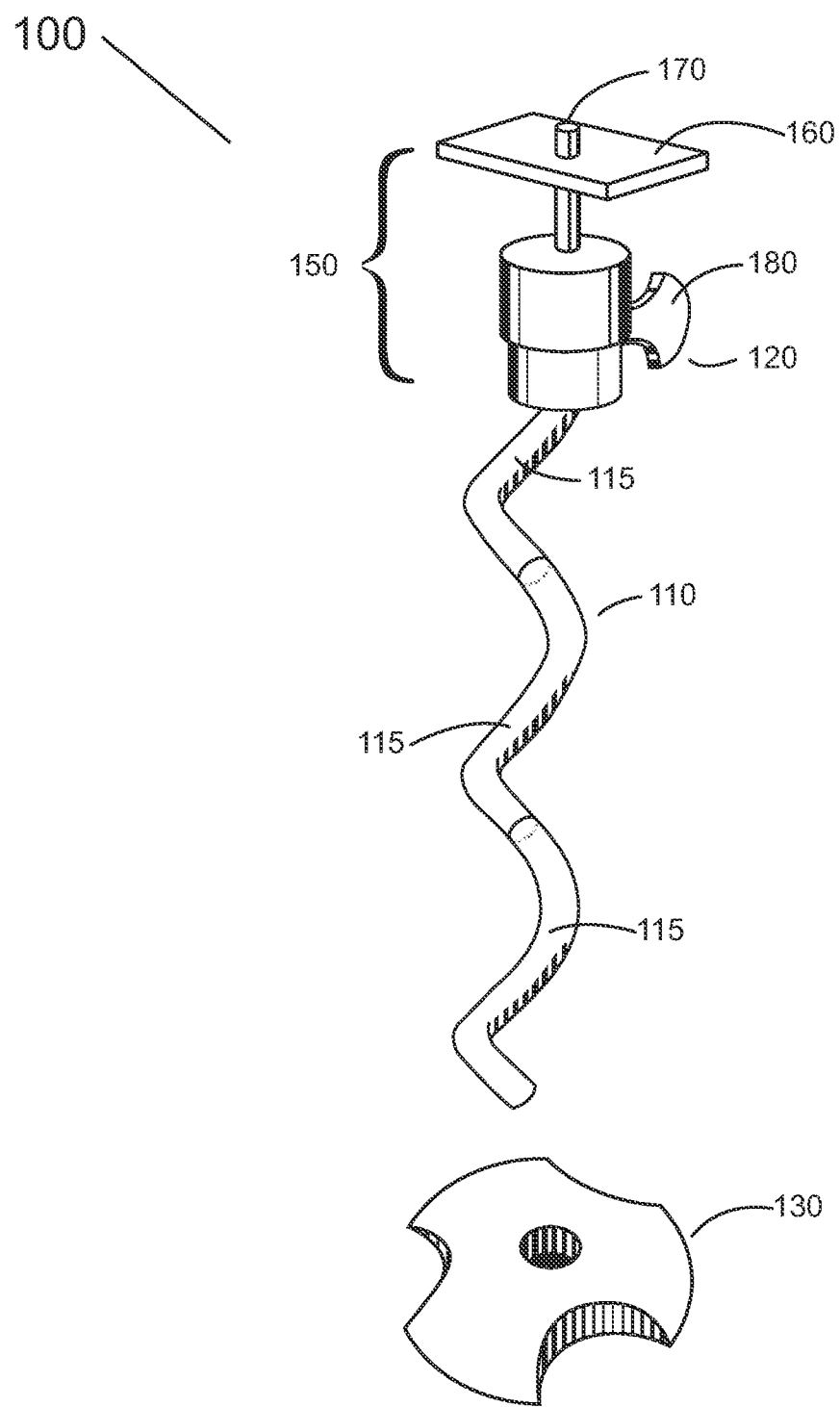
FIG. 1 is a perspective view of a set of components for a preferred embodiment of a multiuse mounting system in a single-legged mode.

FIG. 1 is a perspective view of a set of components for a preferred embodiment of a multiuse mounting system 100. Flexible assembly 110 may be made in any number of different ways depending upon the particular application and type or types of devices to be used in conjunction with system 100. U.S. Pat. No. 5,765,938 entitled "Sleeve Retention For Flexible Core Of a Flashlight" and issued on 16 Jun. 1998 (hereby expressly incorporated by reference for all purposes) describes one suitable flexible shape-retaining shaft that may be easily adapted to the present invention. When desired, system 100 may be compactly coiled into a small convenient size for storage and transportation. For use, system 100 is easily uncoiled and attached to a device and suitable support, either in a freestanding support mode or an engaging support mode as will be later described.

Assembly 110 is constructed to be bent, twisted, coiled, draped, wrapped, torsioned, curved, bowed, arched, curled, spiraled, and/or turned into a desired configuration while supporting head 120 and a selected device coupled to head 120. Some applications may require sturdier construction for relatively heavy devices or high use environments where a flex range limit of assembly 110 is frequently tested. Other applications for lighter devices or for uses not requiring particularly steady positioning may use a lighter construction.

Mounting head 120 of the preferred embodiment includes an engagement system 150 adapted for the type of device to be used with system 100. For example, many imaging devices include a standard sized and threaded mating receptacle (e.g., a tripod screw adapter or hole) on one side for attaching a tripod or other structure. Other imaging devices are provided with a specialized or proprietary mating receptacle. Engagement system 150 of the preferred embodiment is complementary to the mating receptacles used with the devices for which system 100 is intended to be used. In some cases, engagement system 150 may be used in cooperation with an adaptor for increasing the types of mating receptacles that may be used with the present invention.

The preferred embodiment illustrates system 100 configured for use with a standard tripod screw hole. In this case, engagement system 150 includes a mounting plate 160 and a standard tripod screw 170 extending above a surface of plate 160. In use after engagement of mounting head 120 with a device, plate 160 supports the device and screw 170 secures the device to system 100. As discussed above, other devices may require use of a different engagement system or an adapter for use with engagement system 150. For purposes of the present application, mount includes engagement system 150 and other systems for gripping, holding, securing, clipping, grabbing, snapping, screwing, clamping, buttoning, and all other manner of attaching, holding and/or securing one device to another (preferably using a releasable/reusable system/method).

Mounting head 120 optionally includes an ergonomic handle 180 used as an aid to move and position mounting head 120 as desired. Optionally, mounting head 120 may include a moveable coupling between engagement system 150 and assembly 110 or between mounting head 120 and assembly 110 permitting further refinements of device orientation without necessarily changing an orientation of assembly 110.

Base 130 of the preferred embodiment is selectively mountable and dismountable to an end of assembly 110 opposite of an end having mounting head 120. Base 130 permits system 100 to become freestanding above a surface supporting base 130. The surface does not have to be particularly flat, level or even. System 100 having base 130 installed and supporting a generally vertical assembly 110 is termed a freestanding support mode. System 100 also includes an engaging support mode in which system 100 interacts with the environment other than through base 130 to support a device for use and/or operation.

The engaging support mode may be easier to implement for a user when base 130 is detached, but not all applications require detachment of base 130. It is an advantage of system 100 is that when base 130 is detached and system 100 is in the engaging support mode, assembly 110 may have a second end (the end from which base 130 was detached) available for supporting a second mounting head or other function, for example simply by addition of a second mounting head 120 (not shown). The second mounting head could permit two imaging devices to be used concurrently, or the second mounting head could support a second device providing complementary feature or functions to the first device or to the operation. For example, a detachable self-powered illumination system could be used with the second mounting head, or a reflector/illumination system or other appropriate device may be used.

In some applications, base 130 may not be detachable, but mounted intermediate two ends of assembly 110. This implementation permits two or more mounting heads to be used concurrently with base 130.

In other applications, base 130 may include a controller or power source, or a port for attaching a controller or power source, for communicating with the devices through communication channels provided in assembly 110 and accessible using data/power connectors in mounting head 120. The communication could be for control or coordination of functions of the devices, or other functions built into mounting head 120.

Figure 2:
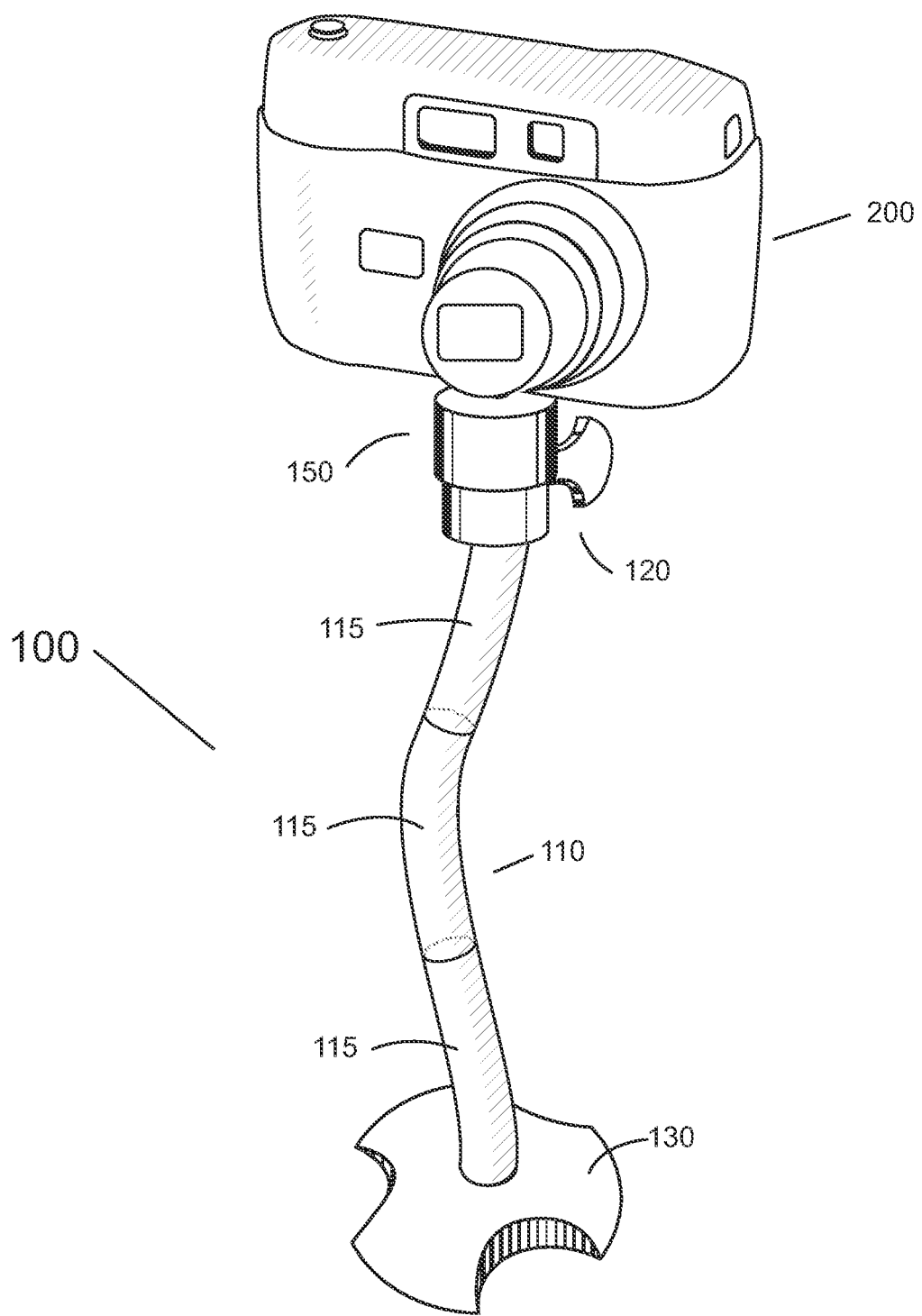
FIG. 2 is a perspective view of the multiuse mounting system shown in FIG. 1 engaging an imaging device in a freestanding support mode.

FIG. 2 is a perspective view of multiuse mounting system 100 shown in FIG. 1 engaging an imaging device 200 in the freestanding support mode. Device 200, secured to system 100, may be oriented into virtually any position. The orientation aims device 200 in any direction in three-dimensions and permits a height adjustment from near a height at a level near base 130 up to a maximum length of assembly 110 when assembly 110 is straight and unbent and extending away from base 130. In some cases and configurations, it is possible to adjust a height of device 200 to be below base 130 such as when base 130 is near an edge and base 130 and assembly 110 can counterbalance the particular orientation.

Multiuse mounting system 100 shown in FIG. 1 may be used in an engaging support mode. Engaging support mode includes establishing some other relationship (e.g., wrapping, draping, coiling, and the like) between system 100 and an object to secure system 100 to the object. Assembly 110 may be wrapped about the object when the object extends vertically, horizontally, or includes some other orientation. The object could include a pole, a limb, a support column, a chair leg, a tree branch or virtually any other object. The object need not be vertical, but it could be horizontal or assume some arbitrary angle. Attaching a device to system 100 permits such device to assume virtually any desired orientation relative to the object.

Figure 3:
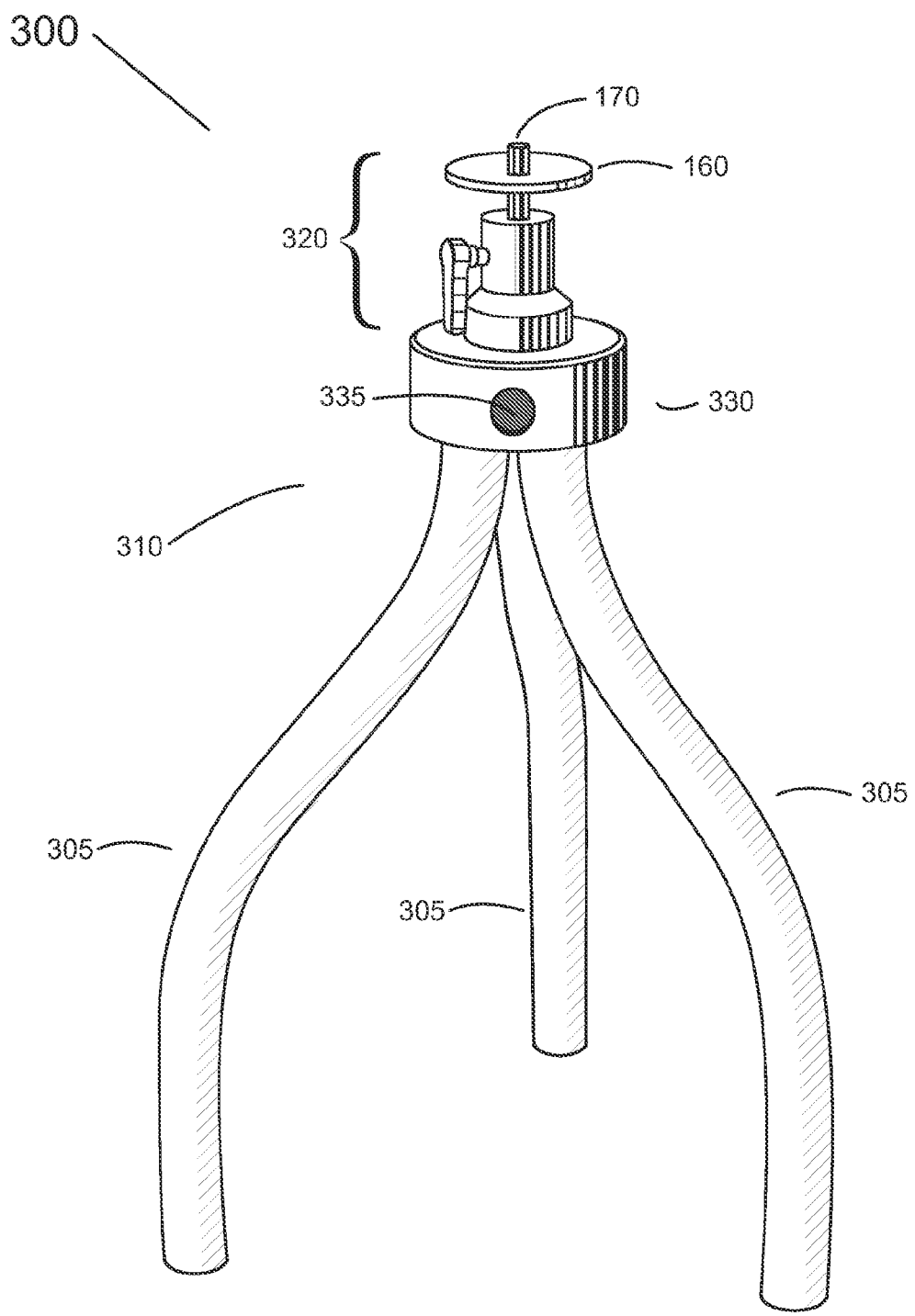
FIG. 3 is a perspective view of the preferred embodiment for a multiuse device system in a multi-membered mode.

FIG. 3 is a perspective view of the preferred embodiment for a multiuse device system 300 in a multi-membered mode. System 300 includes three flexible assemblies 110 shown in FIG. 1 and a modified version of mounting head 120 to provide a "tripod" mounting head 310 that engages a plurality of members 110 (e.g., three flexible assemblies 110 as shown in FIG. 1) in tripod mode. Mounting head 310 includes a mount system 320 and a member attachment system 330. System 300 is transformable into system 100 shown in FIG. 1 through FIG. 3 by detaching two members 110 from head 310 and coupling all three members 110 together to form a single long flexible assembly 110 coupled to head 310. Depending upon the desired implementation, a base 130 shown in FIG. 1 may be added as well.

Each member 110 includes a coupler (e.g., an extended threaded member—not shown—though other engagement systems like snap couplers, bayonet, or ball/socket systems and the like may be used) at a first end. The coupler engages a complementary receptacle provided in head 310 (e.g., provided in an underside of member attachment system 330). In the preferred embodiment, member attachment system 330 includes three mating receptacles on the underside, as well as one or more mating receptacles 335 on a sidewall of system 330. Additionally, mount system 320 is preferably coupled to the member attachment system using a similar engagement system to permit one or more members 110 to be inserted between mount system 320 and member attachment system 330. Each second end of member 110 includes a similar complementary receptacle to permit members 110 to be coupled together to form a single long flexible member coupled to head 310, thus recreating the structure shown in FIG. 1 through FIG. 3. Decoupling members 110 from each other and reengaging members 110 to head 310 recreates the tripod mode.

Figure 4:
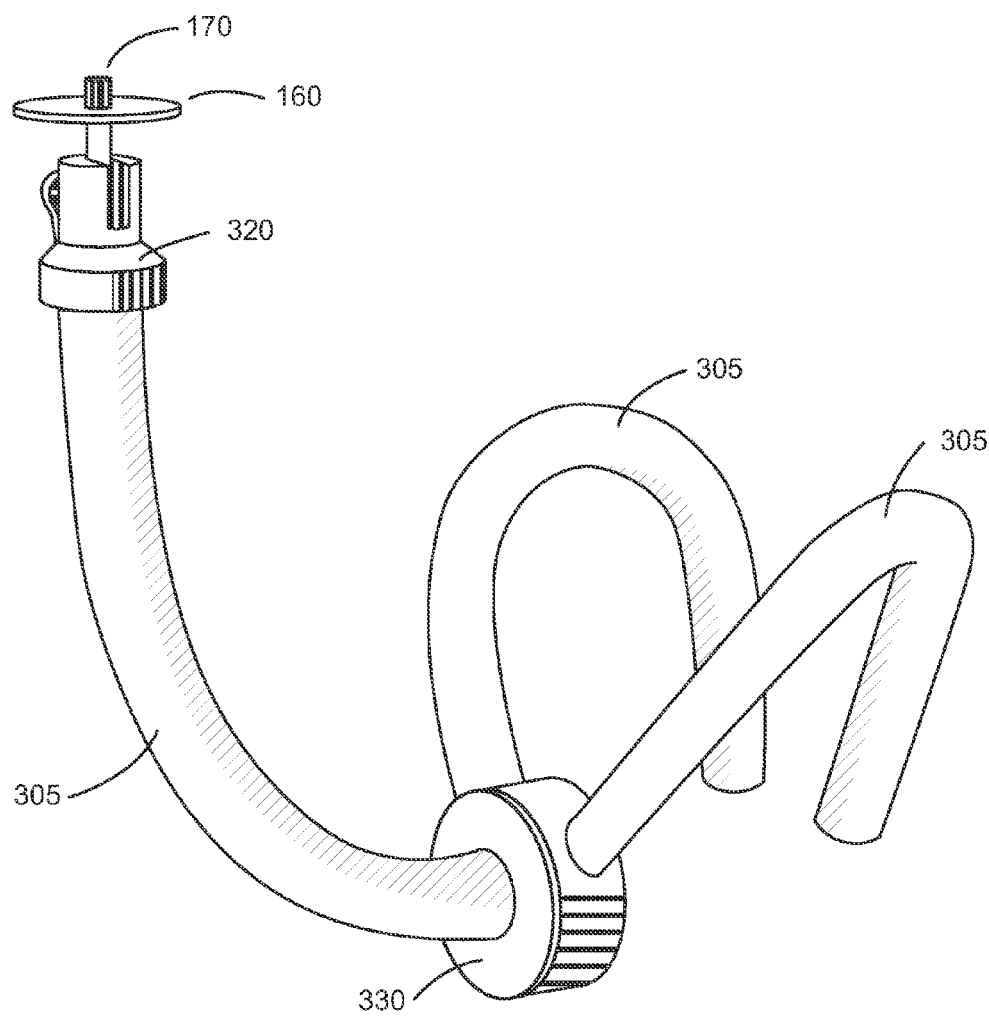
FIG. 4 is a perspective view of the preferred embodiment shown in FIG. 3 configured for draping over a horizontal member (e.g., a back of a chair)

FIG. 4 is a perspective view of system 300 shown in FIG. 3 configured for draping over a horizontal object (e.g., a back of a chair). In this configuration, mount system 320 and member attachment system 330 are separated with a flexible member 110 removed from an underside of member attachment system 330 and inserted between them. The other two members 110 are moved from the underside of system 330 to the sidewall. The two sidewall-mounted members 110 engage the horizontal object to position and secure leg attachment system 330 in a specific location. Mounting system 320 is then adjustable relative to leg attachment system 330 to position any device attached to screw 170 and/or plate 160.

FIG. 4 may be alternately adjusted for many different configurations including engagement with a vertical rectangular abutment (e.g., an end of a wall) as shown in the incorporated related patent. In this use, flexible members 110 are preferably configured for lateral engagement by use of a suitable material on one or more exterior portions of members 110, or use of lateral engagement structures incorporated into one or more members 110. A suitable material would be one having a relatively high coefficient of friction in cooperation with the abutment 600. As the coefficient of friction is a relative measurement between two surfaces, the suitable material would one that exhibits the desired frictional force in the particular implementation. Certain materials, such as for example Latex®, have a high coefficient of friction relative to many surfaces and materials, and is the preferred material for this type of implementation to produce a surface that is "sticky" to a large number of surfaces.

Additionally, one or more flexible members 110 may be provided with lateral engagement surfaces, either as an intentional additional element or elements to facilitate positioning and engagement of system 400, or as a consequence of the manufacture of flexible member 110. For example, the preferred embodiment for flexible members 110 uses a series of interconnected balls or other elements that imparts a non-uniformly cylindrical surface over its length, forming successive annular peaks and valleys as moving along its length. The natural annular peak and valley structures may be enhanced for the particular application, and in some implementations, only selected portions of the member may be sticky. For purposes of the present application, the term "sticky" includes not only a surface with a relatively high coefficient of friction with respect to intended surfaces for interaction, but also includes assemblies having lateral engagement surfaces or other types of gripping/grabbing structures (e.g., hooks or grippers) along the length or at the end of a member, or a combination of such elements.

In operation, system 300 is oriented generally horizontal, with two members 100 forming "lateral" engagement "arms" and a third member 110 forming a lower support "leg" for cooperative engagement with the vertical abutment. Edges of the abutment engage the valleys of the two lateral members 110, the "sticky" exterior and the shape-retaining manufacture maintain the engagement, thereby maintaining system 300 attached. Additionally, the support leg 110 engages a front surface of the abutment. The three members 110 thus cooperatively maintain head 310 in a desired relationship to the abutment to position and/or secure a device in a desired orientation.

Figure 5:
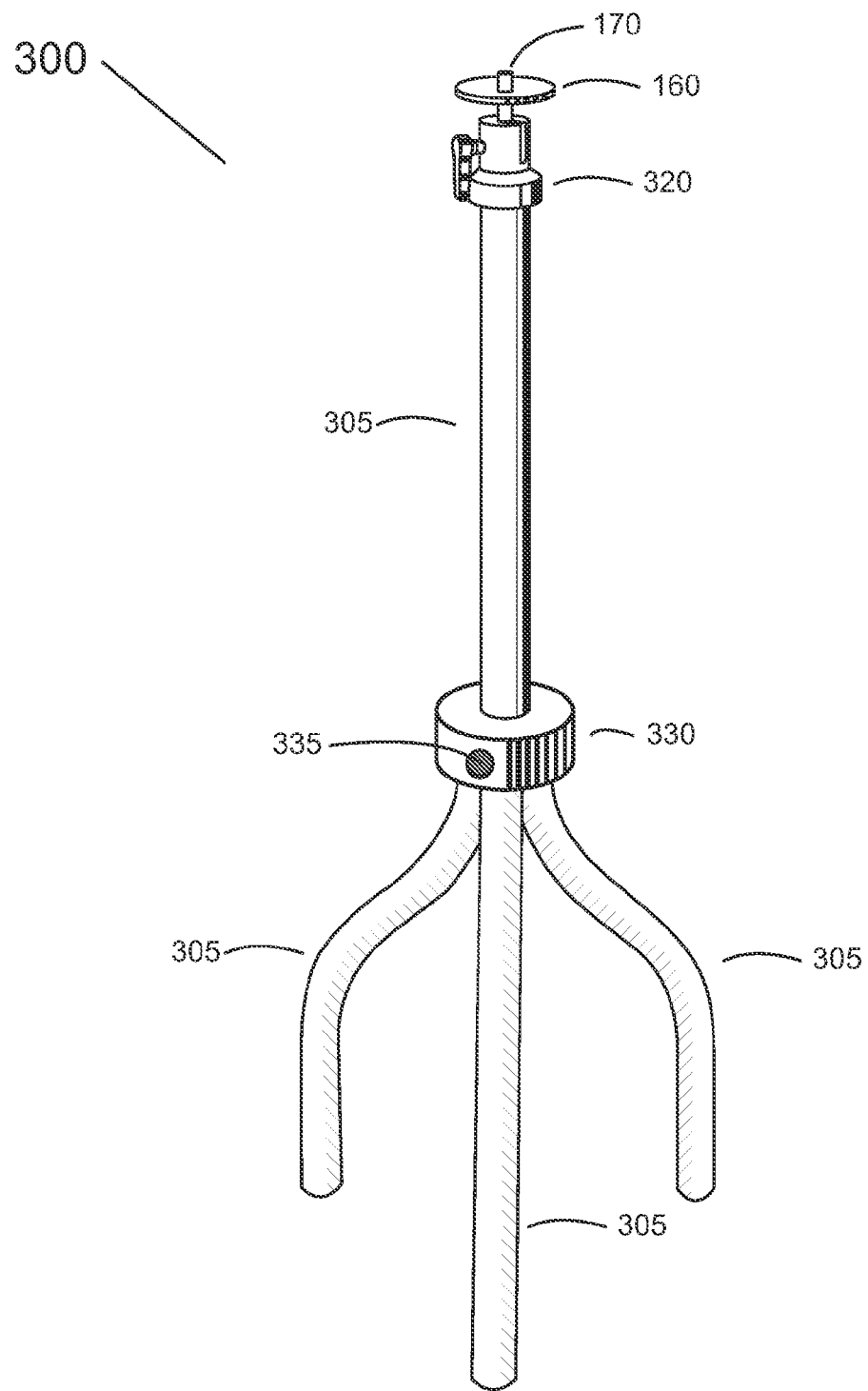
FIG. 5 is a perspective view of an alternate preferred embodiment having four members.

FIG. 5 is a perspective view of an alternate implementation of system 300 having four members 110. System 300 is adaptable for a great many uses, an example is shown in FIG. 5. As described above, leg attachment system 330 of the preferred embodiment includes mating receptacles for six flexible members 110 (three on the underside and three on the lateral surface though other embodiments may have a greater or lesser number in similar or dissimilar locations). Each flexible member 110 includes a coupler at one end for mating to the receptacles and a receptacle for receiving a coupler, permitting daisy-chaining of two or more members 110 together to form a longer member 110. Head 310 includes a mounting system 320 and a member attachment system 330 joined together by a coupler in one and a receptacle in the other to permit one or more flexible members 110 to be inserted between. System 300 includes a base that may be used in cooperation with many particular orientations of members 110. Different types of mounts may be used in cooperation with mount system 320 for gripping, grabbing, holding, engaging, clamping, lashing, securing, and the like one or more different devices or objects. System 300 is thus able to form an interconnected web of different configurations of mounts, mounting systems, bases and members for engaging, supporting, positioning and securing virtually any device or set of devices in a desired relationship to each other and to the environment. As discussed above, the members, systems and structures of system 100 or system 300 are not limited to purely mechanical support. Bases, members, mounts and attachment systems may all be provided with power and/or data and/or communications channels use among the elements and in cooperation with the devices and/or objects supported, gripped, help, positioned, and/or secured (for example) using system 300. The preferred embodiment employs, in certain implementations, different sizes of member assemblies 110. System 300 is able to, in a single device, employ larger assemblies for one type of function (e.g., weight support) and smaller assemblies for other functions (e.g., fine positioning). Multiple types of multiple assemblies may be used. In some instances, system 300 employs adapters and/or extenders to permit construction of these elements, such as coupling one size/shape of member to another size/shape. Additionally, adapters enable further connectivity and coupling, such as by having adapters with two receptacles or two couplers. Some adapters may include multiple numbers of receptacles and/or couplers beyond two. Further, adapters may include additional power/data/communications sources, channels and or interface elements. In some instances, the mounting system may be integrated or otherwise incorporated into or become a part of a device or object. Such a mounting system may be removable, or remain permanently affixed. In such an embodiment, it may be convenient to provide storage or stowage for flexible members for instances when the device/object is used without the one or more flexible assemblies.

The types and numbers of objects, devices and "things" that may be attached, held, secured, and/or positioned using the present invention is virtually unlimited. The preferred embodiment is a device for attaching, holding, securing, and/or positioning a wide variety of imaging systems through use of standard types of mounting engagement systems used, for example, with conventional tripod devices. The present invention is not limited to use with just imaging devices, as various implementations may be used in many different contexts. For example, variations of the multiuse system may be also used for toy legs (to hold toys or objects to another toy or object), a holder for a flashlight, a support/rest for a firearm used by a marksman, "ties" or "wraps" to engage or wrap elements. The member assemblies need not be removable, but could be manufactured or relatively permanently affixed to an object. The flashlight and firearm support are examples that could be incorporated into the object. Virtually any object could be provided (during manufacture or retrofit) with a complementary mating system. A version of the member assembly could be provided in cooperation with electrical, data, pipe or other conduit (e.g., provide an assembly at five feet intervals along its length) to "lash" the conduit to a railing or other support. Such a system could provide many benefits, including temporary provision/deployment of power, water, communications, or whatever. As shown in FIG. 5, a version having four or more "members" could use three to support the other members, and the other members could actually be active devices, such as the flashlight or illumination system, lighted mirror, thermometer, wireless hub transceiver. Adding a clip or cup to the additional member makes the device a general holder for signs and the like.

As shown in FIG. 1 through FIG. 3 and as further suggested above, a single member assembly having an integrated engagement system is very useful. Particularly in instances in which the assembly is a power/data/communications conduit and the engagement system includes a coupling system that connects to the desired power/data/communications channel. For example, a workspace could be outfitted with several assembly outlets, and a user is able to engage assemblies (e.g. possibly of different size, function or type) into the outlets. A suitable suite of devices (e.g., illumination, cutting, soldering, test equipment, polishing, welding, punching, drilling, and the like) may be used in cooperation with these assemblies by selectively engaging with the engagement system to provide a wide variety of tasks at the workspace. The suite of devices is designed and adapted for the range of tasks at the workspace.

Figure 6:
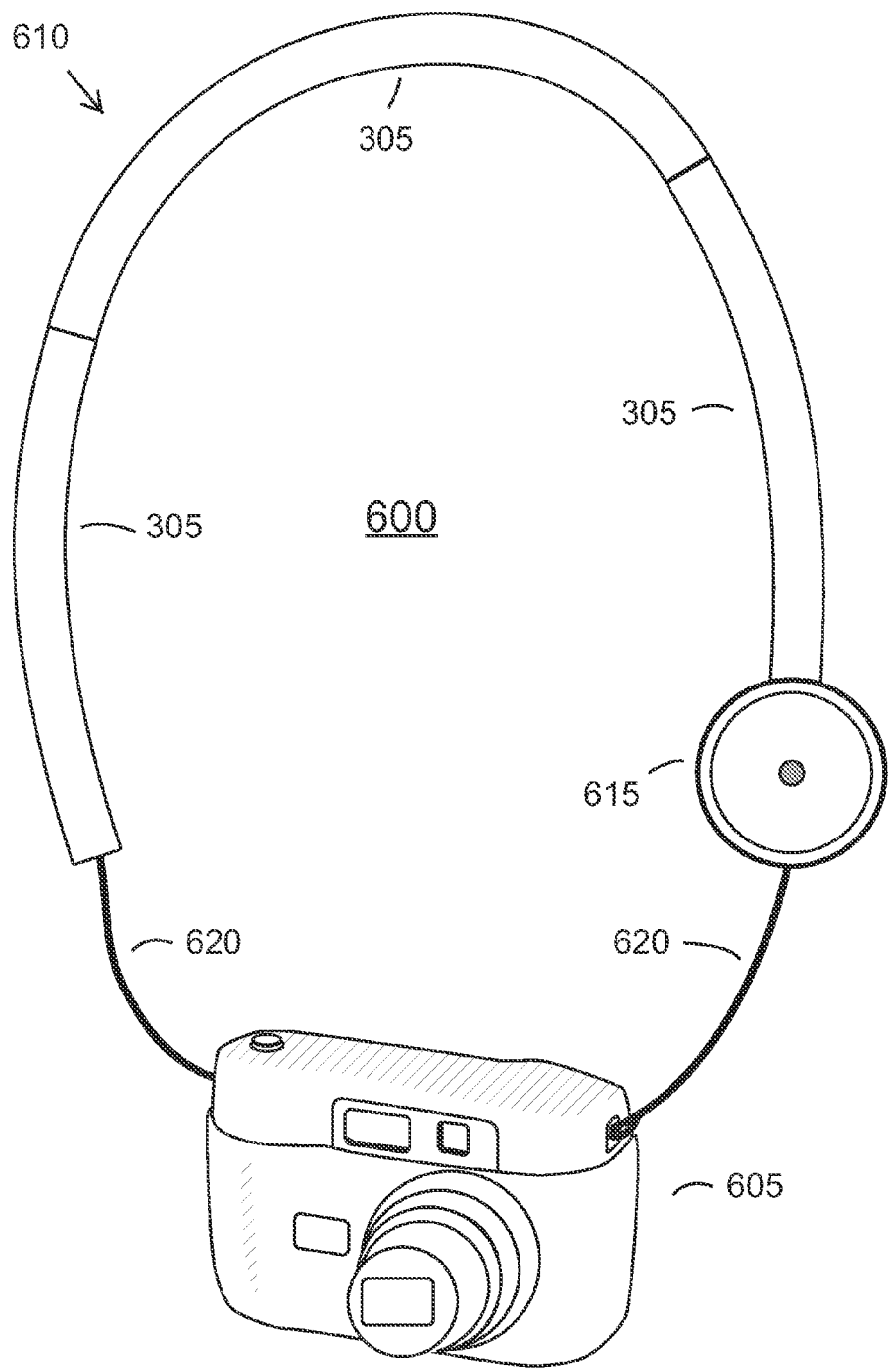
FIG. 6 is a perspective view of the preferred embodiment for a multiuse device system configured in a portability mode in cooperation with a portable pointing device, the device including a dual-point strap attachment system.

FIG. 6 is a perspective view of the preferred embodiment for a multiuse device system 600 configured in a portability mode in cooperation with a portable pointing device 605, device 605 including a dual-point strap attachment system. Device 605 includes imaging, illumination, audio, visual, and projectile, and other portable and directional subsystems and elements. System 600 includes a series of flexible strap support members (e.g., members 115 shown in FIG. 1 through FIG. 3) configured into a string 610 "snake" mode having two ends. One end of string 610 is attached to an attachment body 615 (e.g., engagement system 150 shown in FIG. 1 and FIG. 2, mount system 320 shown in FIG. 3 or the like). System 600 uses one or more adapters 620 to couple pointing device 605 to the combination of string 610 and attachment body 615. System 600 employs two adapters 620 to couple attachment body 615 and an end of string 610 not coupled to attachment body 615 to device 605.

In operation, a sufficient number of flexible members are configured into string 610, one end of string 610 attached to attachment body 615 (a sidewall receptacle in a preferred embodiment) and adapters 620 used to complete a loop by joining string 610/body 615 to device 605. A user may place a head/neck, an arm/shoulder, an article being carried/worn by the user, or the like through the loop thus formed and permit the mounting system to be easily carried as part of the device without requiring extensive take-down and setup. Note that in the preferred embodiment, system 600 is formed from dual-use elements of the mounting system, such as one or more of the components shown in FIG. 1 through FIG. 5. However, in some embodiments, it may be desirable/necessary to provide specialized elements to cooperate with existing mounting system components. For example, attachment body 615 is formed from all or part of a mounting head. In some instances, a special attachment body may be provided that may further include an integrated adapter. That integrated adapter may be retractable/extendable relative to the attachment body. Further, in some embodiments, two attachment bodies may be used, one at each end of string 610.

As noted above, there are many different types of mating systems that may be used for intercoupling the components of the mounting systems shown in FIG. 1 through FIG. 5. Adapters 620, when necessary, are compatible with those mating systems and may provide a conversion, when necessary or desirable, the coupling system of the mounting system with the various possible attachment/support systems of device 605.

Figure 7:
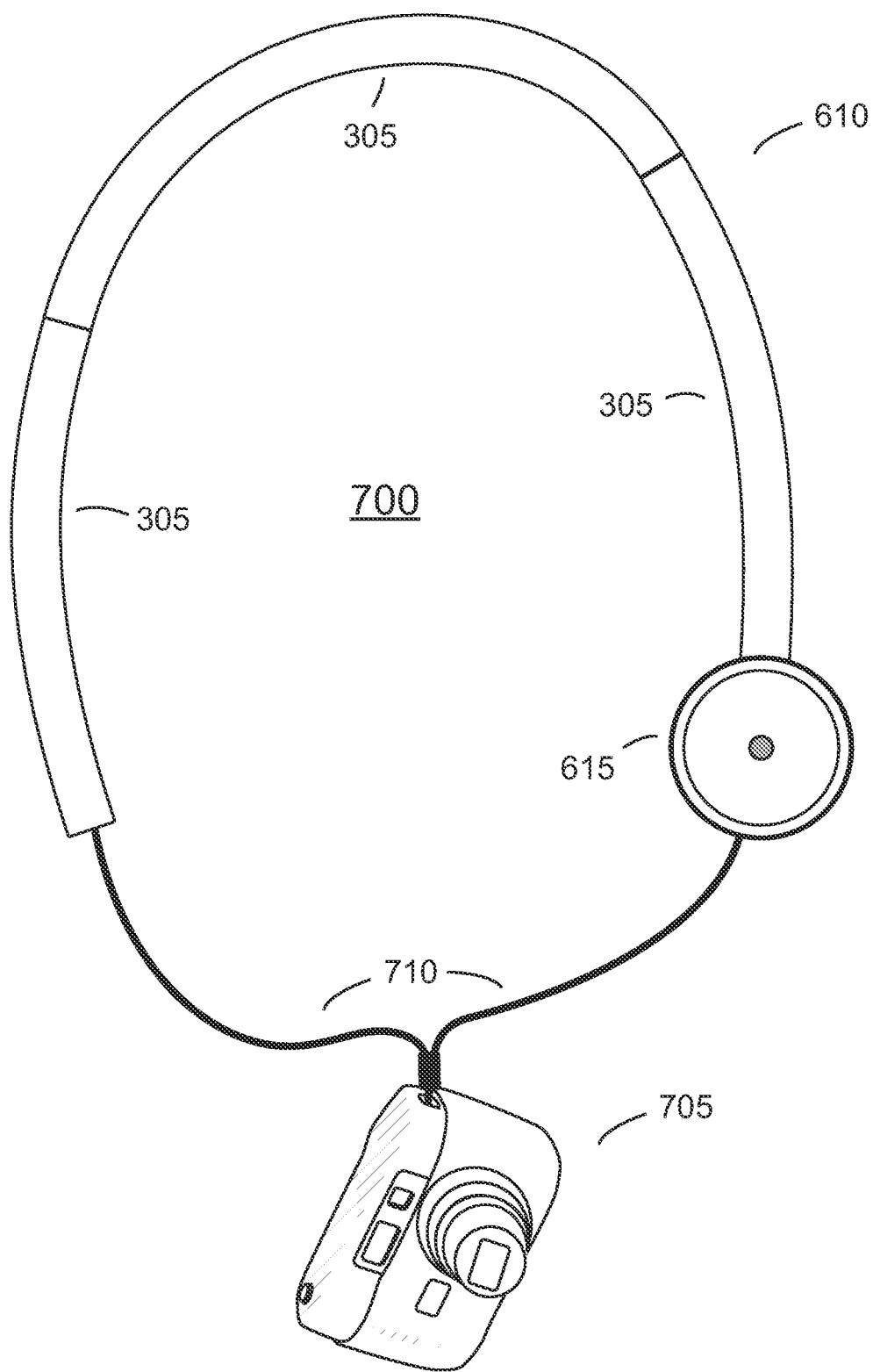
FIG. 7 is a perspective view of the preferred embodiment for a multiuse device system configured in a portability mode in cooperation with a portable pointing device, the device including a single-point strap attachment system.

FIG. 7 is a perspective view of the preferred embodiment for a multiuse device system 700 configured in a portability mode in cooperation with a portable pointing device 705, device 705 including a single-point strap attachment system. System 700 is configured similarly to system 600 except for the use of a different adapter 710. Adapter 710 includes a central device attachment point and two ends. The central device attachment point of adapter 710 is coupled to the single-point strap attachment point of device 705. One end of adapter 710 is coupled to string 610 and the other end of adapter 710 is coupled to attachment body 615.

Figure 8:
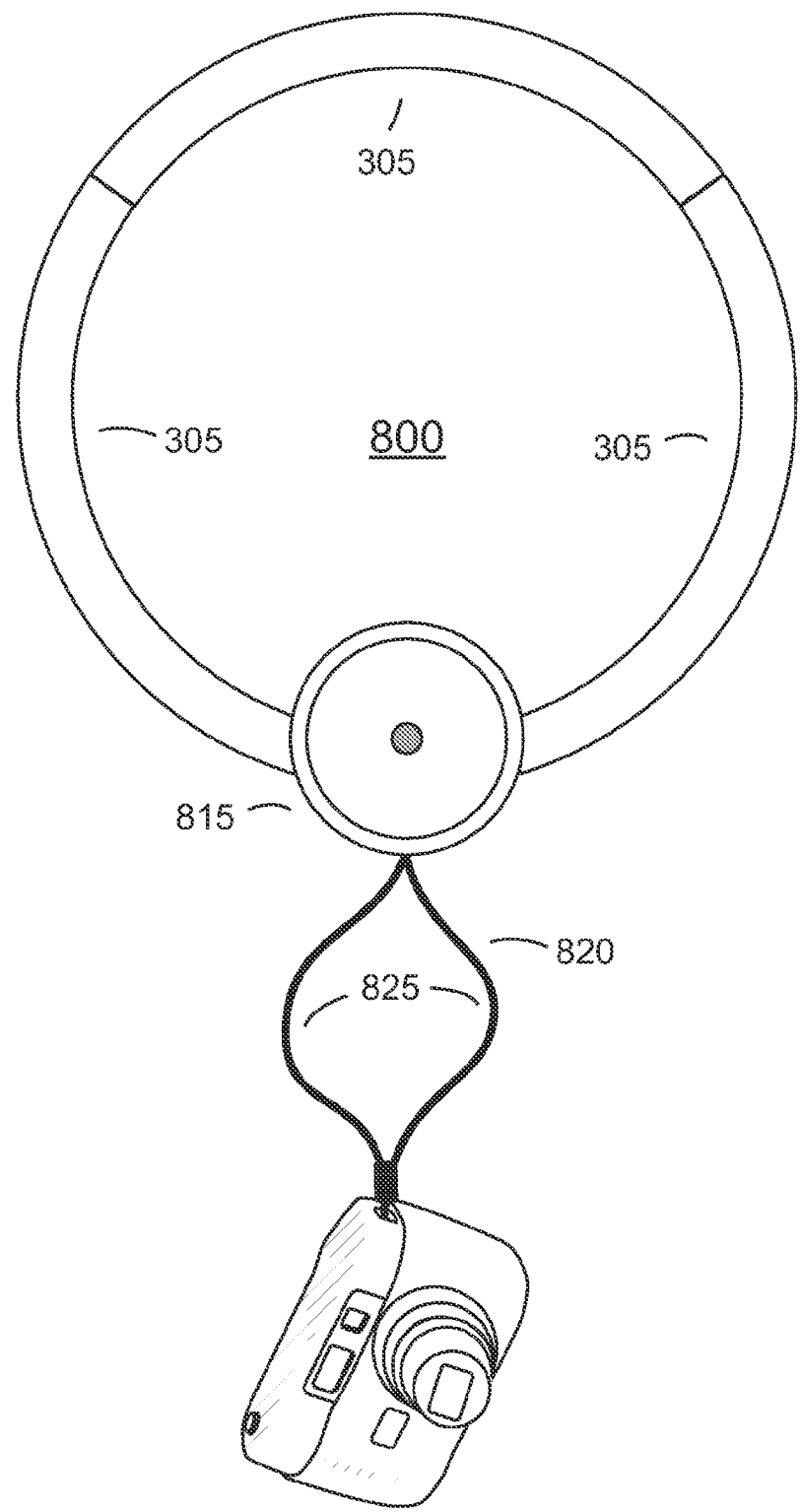
FIG. 8 is a perspective view of the preferred embodiment for a multiuse device system configured in a portability mode in cooperation with a portable pointing device, the device including one or more attachment/connection points for straps or other components.

FIG. 8 is a perspective view of the preferred embodiment for a multiuse device system 800 configured in a portability mode in cooperation with a portable pointing device 705, device 705 including one or more attachment/connection points for straps or other components. System 800 includes a series of flexible strap support members (e.g., members 115 shown in FIG. 1 through FIG. 3) configured into a string 810 "snake" mode having two ends. Each end of string 810 is attached to an attachment body 815 (e.g., engagement system 150 shown in FIG. 1 and FIG. 2, mount system 320 shown in FIG. 3 or the like). System 800 uses an adapter 820 to couple pointing device 705 to attachment body 815. System 800 preferably employs two or more elements 825 with adapter 820 to couple attachment body 815 to device 705.

Figure 9:
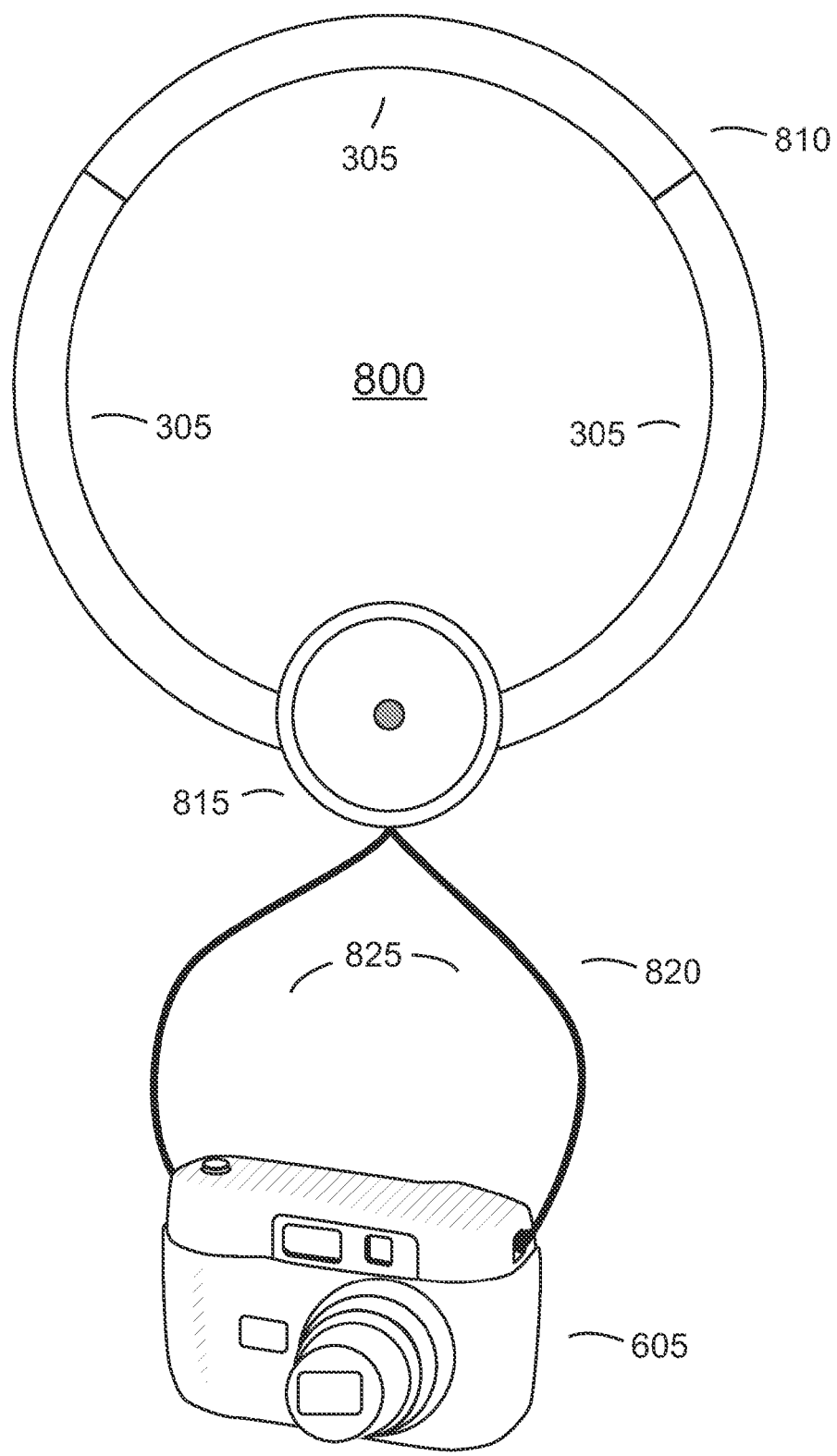
FIG. 9 illustrates use of the system shown in FIG. 8 to attach a dual element adapter to a two strap-attachment point device.

One reason that adapter 820 preferably includes two or more elements 825 is because system 800 is configurable between different modes depending upon the number of attachment points such as shown in FIG. 9 in addition to FIG. 8. FIG. 9 is a perspective view of the preferred embodiment for a multiuse device system 800 configured in a portability mode in cooperation with a portable pointing device 605, device 605 including two or more attachment/connection points for straps or other components.

In the case where a user has a device with a single attachment point, one or more elements 825 may be coupled to that attachment point. In the case that the device has multiple attachment points, the user may still elect to attach one or more elements 825 to a single attachment point (or less than all in multi-attachment point, multi element 825 systems). FIG. 9 illustrates use of system 800 to attach a dual element 825 adapter 820 to a two strap-attachment point device (device 605). As noted herein, attachment body 815 is preferably a dual-use head for configuration between mounting mode and portability mode. However, it is the case that body 815 and/or adapter 820 may also include specialized features for implementation primarily in one mode or the other, or for portability mode and some other mode for the components. As described herein, for example body 815/adapter 820 may be combined and include, in some instances, one or more retractable lanyards or the like as part of elements 825.

Figure 10:
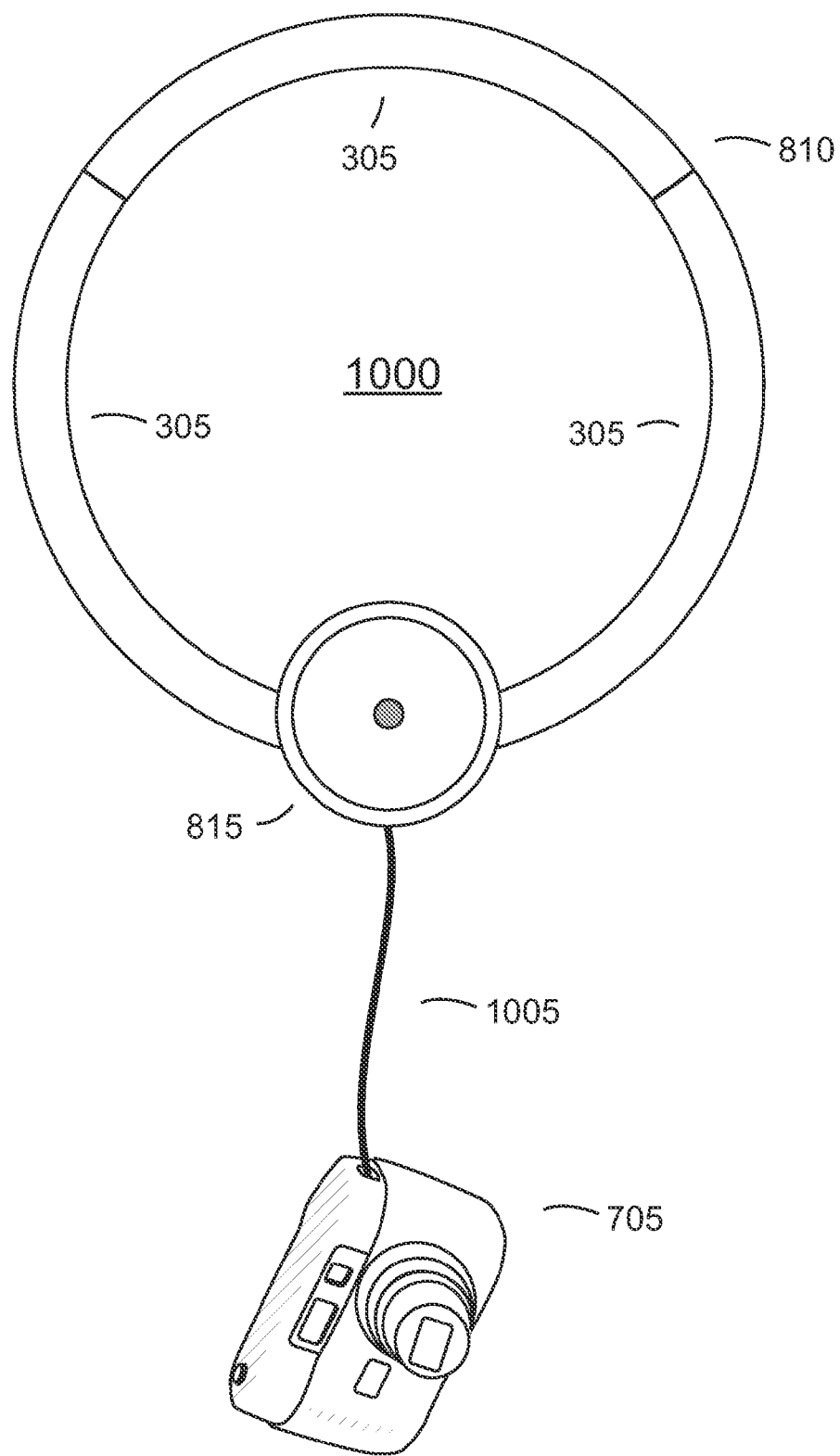
FIG. 10 is a perspective view of the preferred embodiment for a multiuse device system configured in a portability mode in cooperation with a portable pointing device, the device including one or more attachment/connection points for straps or other components.

FIG. 10 is a perspective view of the preferred embodiment for a multiuse device system 1000 configured in a portability mode in cooperation with a portable pointing device 705, device 705 including one or more attachment/connection points for straps or other components. System 1000 includes a series of flexible strap support members (e.g., members 115 shown in FIG. 1 through FIG. 3) configured into a string 810 "snake" mode having two ends as shown in FIG. 8 and FIG. 9. System 1000 uses an adapter 1005 to couple pointing device 705 to attachment body 815. System 1000 preferably employs a single coupling element with adapter 1005 to couple attachment body 815 to device 705. As shown, system 1000 is not reconfigurable for multipoint attachment to a device because adapter 1005 includes the single attachment element.

Figure 11:
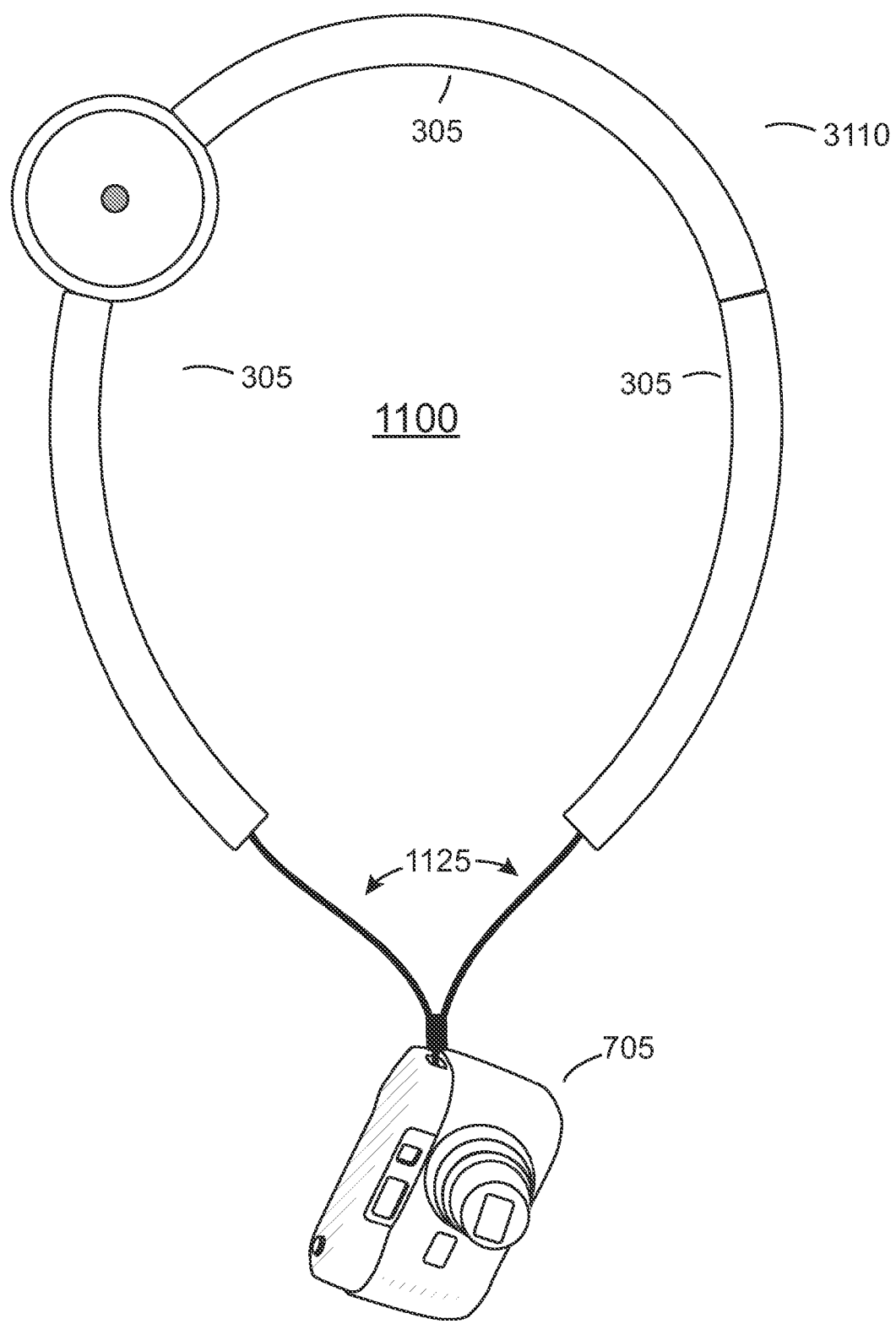
FIG. 11 is a perspective view of the preferred embodiment for a multiuse device system configured in a portability mode in cooperation with a portable pointing device, the device including one or more attachment/connection points for straps or other components.

FIG. 11 is a perspective view of the preferred embodiment for a multiuse device system 1100 configured in a portability mode in cooperation with a portable pointing device 705, device 705 including one or more attachment/connection points for straps or other components. System 1100 includes a series of flexible strap support members (e.g., members 115 shown in FIG. 1 through FIG. 3) configured into a string 1110 "snake" mode with an attachment body 1115 (e.g., engagement system 150 shown in FIG. 1 and FIG. 2, mount system 320 shown in FIG. 3 or the like) coupled within ends of loop 1110. System 1100 uses an adapter 1120 to couple pointing device 705 to the ends of string 1110 and close a loop. System 1100 preferably employs two or more elements 1125 with adapter 1120 to couple string 1110 to device 705.

One reason that adapter 1120 preferably includes two or more elements 1125 is because system 1100 is configurable between different modes depending upon the number of attachment points available and desired to be used.

Figure 12:
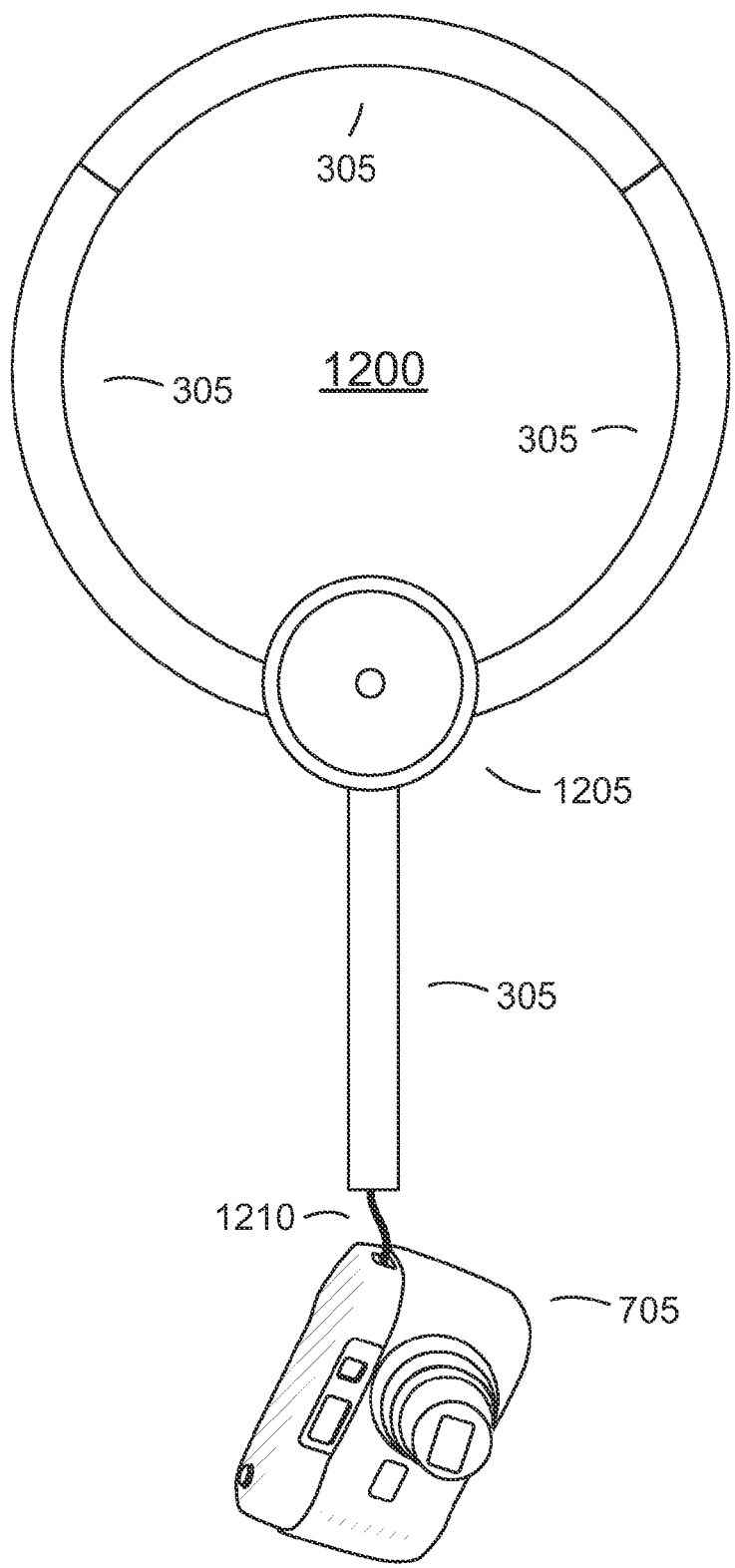
FIG. 12 is a perspective view of the preferred embodiment for a multiuse device system configured in a portability mode in cooperation with a portable pointing device, the device including one or more attachment/connection points for straps or other components.

FIG. 12 is a perspective view of the preferred embodiment for a multiuse device system 1200 configured in a portability mode in cooperation with a portable pointing device 705, device 705 including one or more attachment/connection points for straps or other components. System 1200 includes a series of flexible support members (e.g., members 115 shown in FIG. 1 through FIG. 3) configured into a string 1210 "snake" mode having two ends as shown in FIG. 8 through FIG. 10. System 1200 differs from systems illustrated previously in that the other systems were shown, though not limited to, a more "conventional" mounting configuration having three flexible members that are repeatably reconfigurable between the illustrated snake mode and the tripod mode. However, as also shown, some configurations, such as shown in FIG. 5, may advantageously employ four or more flexible members. While any "extra" flexible members may be inserted into the disclosed strings, it is sometimes the case (even for the configurations having less than three flexible legs) that the implementation may permit a string to be formed from two flexible members, or in a simple case, one flexible member, therefore there may be an "extra" flexible member. The configurations shown in FIG. 12 and FIG. 13 represent possible configurations including "extra" flexible members, extra in this context including flexible members not included in the loop forming elements as disclosed herein.

System 1200 includes one or more extra-loop contributing members into a coupling system for attaching the "loop" members to ported device or devices. A flexible member 115 is coupled between attachment body 1205 and device 705 preferably by use of an adapter 1210. Note that a preferred embodiment includes a dual-use attachment body 1205 including three mating elements on an "underside" and three mating elements distributed on a perimeter (as shown). In FIG. 12, all three of these mating elements are used.

System 1200 uses adapter 1210 to couple pointing device 705 to a flexible member 115. System 1200 preferably employs a single coupling element with adapter 1210. As shown, system 1200 is not reconfigurable for multipoint attachment to a device because adapter 1210 includes the single attachment element. However, adapter 1210 may be replaced with a different adapter implementing some of the ideas presented herein for a multipoint attachment system.

Figure 13:
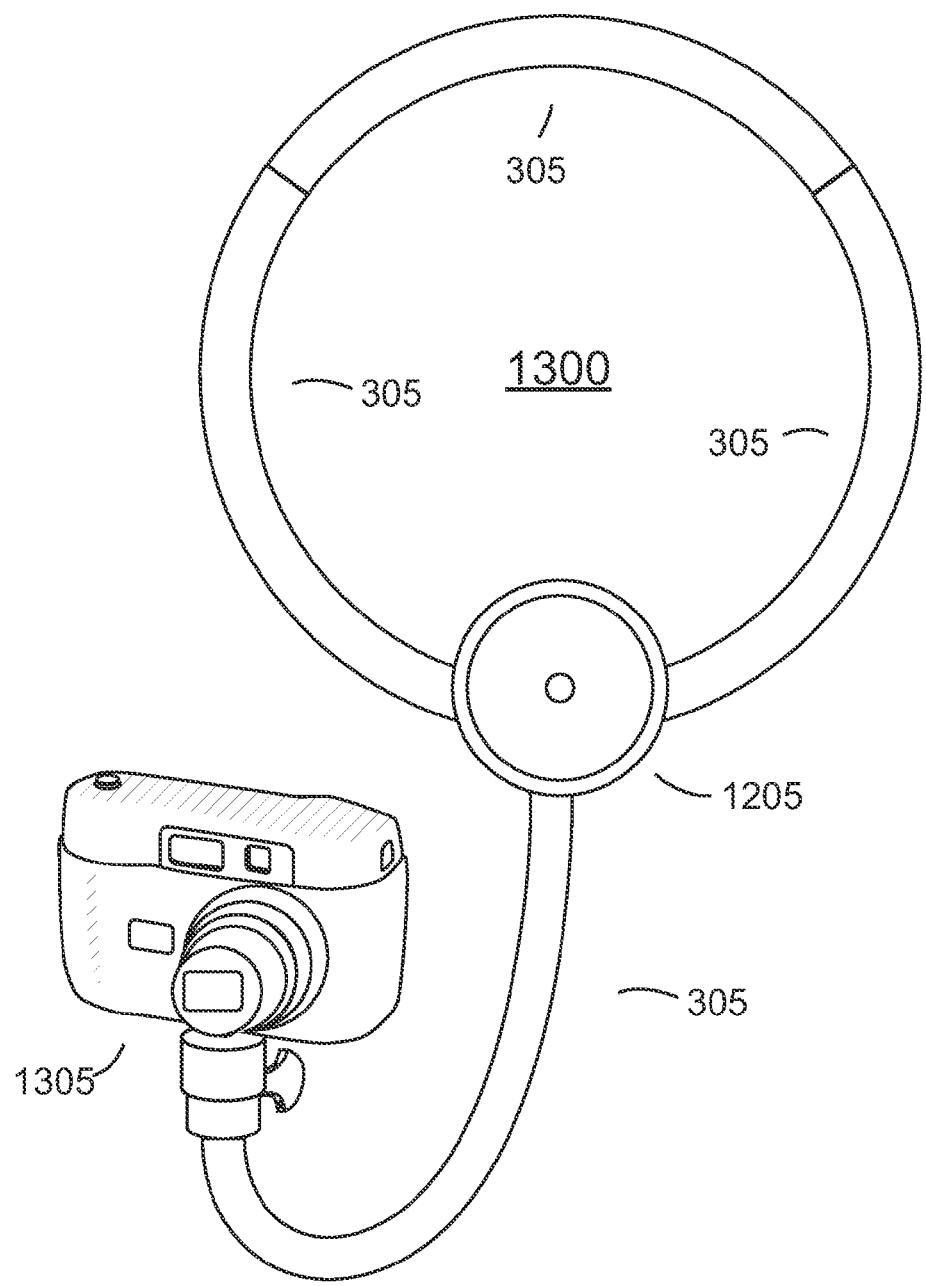
FIG. 13 is a perspective view of the preferred embodiment for a multiuse device system configured in a portability mode in cooperation with a portable pointing device, device including zero or more attachment/connection points for straps or other components but including the disclosed standard mounting point (e.g., tripod mounting connector).

FIG. 13 is a perspective view of the preferred embodiment for a multiuse device system 1300 configured in a portability mode in cooperation with a portable pointing device 1305, device 1305 including zero or more attachment/connection points for straps or other components but including the disclosed standard mounting point (e.g., tripod mounting connector). System 1300 includes a series of flexible support members (e.g., members 115 shown in FIG. 1 through FIG. 3) configured into a string 810 "snake" mode having two ends as shown in FIG. 8 through FIG. 10. An advantage of system 1300 is that it does not employ any adapter element.

Different users will employ different configurations, and any particular mounting configuration may be reconfigured in one or more different porting configurations. Depending upon many factors, some of which include a particular mounting configuration, preferred manner of carrying the pointing device, speed requirements for reconfiguration/mode transition, will influence a particular porting configuration.

The incorporated related patent identified a reconfigurable system for changing between mounting mode, the present invention contemplates construction and configuration of the mounting elements for dual-use to permit them to be reconfigured into carrying/porting elements/configurations. In some cases, a user need only couple two free ends together, no matter the mounting configuration, which may use an adapter, and use the resulting loop to help carry the system. The user only reverses this and the system is ready for re-use, in virtually the same mounting configuration as before. Such an adapter may include a handle or other structure to improve carrying/portability.

While the systems, components, and elements illustrated in FIG. 1 through FIG. 5 are virtually identical to the incorporated related patent, a difference not easily reflected in the structural elements is important for the present invention. One consideration of any dual-use mounting system elements and strap/portability elements is that they are designed to resist tensile forces in addition to the compression loading elements of the mounting systems. The incorporated related patent did not expressly include such considerations. While in many cases, it may be the case that a structure, coupling, or the like is suitably designed for the expected compression and tensile loads, the present invention advantageously asks the additional question and may result in additional structural changes to advantageously implement the embodiments of the present invention.

What should also be mentioned, and is illustrated in FIG. 13, is that the devices typically employ different types of mounting systems. For example, the standard tripod mount and one or more strap/lanyard attachment points. It is a feature of several of the embodiments of the present invention to permit a user to have flexibility when transitioning to a portability mode to use the strap attachment points instead of, or in addition to, the tripod operational mount. Devices 605 and 705, like 1305, contemplate such an operational mount.

The system and methods above have been described in the preferred embodiment of a flexible mounting system and method that eases challenges associated with relocating a stationary mounting system used with portable electronic devices. For ease of understanding and simplification of discussion, the embodiments of the present invention have focused on implementation using a camera as the portable pointing device, a tripod having one or more flexible legs that are dual-purpose and used for both the tripod mount and for "carrying straps." It is possible to adapt the present invention to other portable pointing devices, that is those which have an operational mode or feature that are pointed or directed in a particular direction, often for an extended time. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A tripod system for an imaging device, the tripod convertible to a carrying system for the imaging device and the imaging device including a strap connector, comprising:
   three support legs, including a first support leg, a second support leg, and a third support leg, each said support leg including a flexible assembly having a proximal end with a quick-connect coupler and a second end having a quick-connect coupler matable to said quick-connect coupler of said proximal end, each said assembly adapted to be repetitively positioned into a plurality of orientations by moving said assembly into a first particular orientation wherein said assembly retains said first particular orientation until said assembly is moved into a second particular orientation; and
   a body including three quick-connect couplers matable to said quick-connect couplers at said proximal ends;
   said reconfigurable support system forming a tripod in a first mode with said quick-connect couplers at said proximal ends of said support legs mated to said quick-connect couplers of said body;
   said reconfigurable support system forming a strap assembly in a second mode wherein said strap assembly includes said support legs and said body arranged in a strap having a first strap end and a second strap end with said support legs and said body serially-coupled together therebetween including a proximal end of said first support leg coupled to said second end of said second support leg and said proximal end of said third support leg coupled to said body, said strap assembly further including a strap coupler, coupled to both said first strap end and said second strap end and to the strap connector of the imaging device.

2. The tripod system of claim 1 wherein said first strap end corresponds to said second end of said first support leg, wherein said second strap end corresponds to said second end of said third support leg, and wherein said strap assembly further includes said proximal end of said second support leg coupled to said body.

3. The tripod system of claim 1 wherein said first strap end corresponds to said second end of said first support leg, wherein said second strap end corresponds to one of said quick-connect couplers of said body, and wherein said strap assembly further includes said proximal end of said second support leg coupled to said second end of said third support leg.

4. The tripod system of claim 1 wherein the strap connector includes a first connection point at a first location of the imaging device and a second connection point at a second location of the imaging device.

5. The tripod system of claim 2 wherein the strap connector includes a first connection point at a first location of the imaging device and a second connection point at a second location of the imaging device and wherein said strap coupler includes a first strap coupler segment extending from said first strap end to said first connection point and a second strap segment extending from said second strap end to said second connection point.

6. The tripod system of claim 3 wherein the strap connector includes a first connection point at a first location of the imaging device and a second connection point at a second location of the imaging device and wherein said strap coupler includes a first strap coupler segment extending from said first strap end to said first connection point and a second strap segment extending from said second strap end to said second connection point.

7. A tripod system converting method for an imaging device, the tripod converting from a tripod to a carrying system for the imaging device, the imaging device including a strap connector, comprising:
   a) forming a tripod using a set of tripod components having three support legs and a body, including a first support leg, a second support leg, and a third support leg, each said support leg including a flexible assembly having a proximal end with a quick-connect coupler and a second end having a quick-connect coupler matable to said quick-connect coupler of said proximal end, each said assembly adapted to be repetitively positioned into a plurality of orientations by moving said assembly into a first particular orientation wherein said assembly retains said first particular orientation until said assembly is moved into a second particular orientation; said body including three quick-connect couplers matable to said quick-connect couplers at said proximal ends, with said tripod including said quick-connect couplers at said proximal ends of said support legs mated to said quick-connect couplers of said body; and thereafter b) forming a strap assembly from said set of tripod components wherein said strap assembly includes said support legs and said body arranged in a strap having a first strap end and a second strap end with said support legs and said body serially-coupled together therebetween including a proximal end of said first support leg coupled to said second end of said second support leg and said proximal end of said third support leg coupled to said body, said strap assembly further including a strap coupler coupled to said first strap end and to said second strap end; and c) attaching, using said strap coupler, said strap assembly to the strap connector of the imaging device.

* * * * *